United States Patent
Breiholdt

(12)
(10) Patent No.: US 6,467,405 B1
(45) Date of Patent: Oct. 22, 2002

(54) METHOD FOR ENGRAVING PRINTING BLOCKS

(75) Inventor: Jan Herrmann Breiholdt, Kiel (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 0 days.

(21) Appl. No.: 09/601,487

(22) PCT Filed: Jan. 27, 1999

(86) PCT No.: PCT/DE99/00200

§ 371 (c)(1),
(2), (4) Date: Aug. 3, 2000

(87) PCT Pub. No.: WO99/41078

PCT Pub. Date: Aug. 19, 1999

(30) Foreign Application Priority Data

Feb. 10, 1998 (DE) .......................................... 198 05 179

(51) Int. Cl.⁷ ................................................. B41L 3/02
(52) U.S. Cl. .......................... 101/32; 101/3.1; 101/170; 358/297; 358/298; 358/299
(58) Field of Search .......................... 101/3.1, 32, 150, 101/153, 170, 401.1, 297; 358/298, 299

(56) References Cited

U.S. PATENT DOCUMENTS

| | | | | |
|---|---|---|---|---|
| 4,729,037 A | * | 3/1988 | Doelves ...................... | 358/299 |
| 4,852,485 A | | 8/1989 | Brunner | |
| 5,293,426 A | * | 3/1994 | Wouch et al. ................. | 382/1 |
| 5,402,246 A | * | 3/1995 | Seitz et al. .................. | 358/299 |
| RE35,911 E | * | 9/1998 | Seitz et al. .................. | 358/299 |
| 5,825,503 A | * | 10/1998 | Brewer et al. ............... | 358/299 |
| 6,339,991 B1 | * | 1/2002 | Lubcke ........................ | 101/3.1 |
| 6,357,976 B1 | * | 3/2002 | Weidlich ..................... | 101/32 |

FOREIGN PATENT DOCUMENTS

| | | |
|---|---|---|
| DE | 681 929 | 6/1993 |
| DE | 195 33 811 | 3/1997 |
| GB | 2 063 005 | 5/1981 |
| GB | 2 100 093 | 12/1982 |
| WO | WO 94/19900 * | 9/1994 |
| WO | WO 96/05966 | 2/1996 |
| WO | WO 96/26837 | 6/1996 |

* cited by examiner

Primary Examiner—Andrew H. Hirshfeld
Assistant Examiner—Kevin D. Williams
(74) Attorney, Agent, or Firm—Schiff Hardin & Waite

(57) ABSTRACT

In a method for engraving printing forms for rotogravure on a printing cylinder in an electronic engraving machine with an engraving element charged by an engraving control signal that engraves a sequence of cups arranged in an engraving raster into the print cylinder engraving line by engraving line, by positioning elements to be engraved in the printing form the cylinder layout of the printing form is designed in a workstation (3) under visual control. The engraving data required for engraving the printing form are compiled from the engraving data of the individual elements according to the cylinder layout. During a test cut before the engraving, test cups are engraved into the print cylinder within a test cut region and their geomemetric dimensions are interpreted for calibration of the engraving control signal. In order to avoid a faulty positioning of the test cut region on the print cylinder size and position of the test cut region are defined by marking on the basis of the cylinder layout before the engraving of the printing form.

18 Claims, 2 Drawing Sheets

METHOD FOR ENGRAVING PRINTING BLOCKS

BACKGROUND OF THE INVENTION

The invention is in the field of electronic reproduction technology and is directed to a method for engraving printing forms for rotogravure on a print cylinder in an electronic engraving machine.

In an electronic engraving machine, an engraving element with an engraving stylus as a cutting tool moves along a rotating print cylinder in the axial direction. The engraving stylus controlled by an engraving control signal cuts a sequence of cups arranged in an engraving raster into the generated surface of the print cylinder. The engraving control signal is formed by superimposition of image signal values, which represent the gradations to be printed between "light" (white) and "dark" (black), with a periodic raster signal. Whereas the raster signal effects a vibrating lifting motion of the engraving stylus for producing an engraving raster, the image signal values determine the geometric dimensions of the cups engraved into the generated surface of the print cylinder and, thus, the engraved gradations.

The engraving control signal must be calibrated so that thee engraved cups correspond to the gradations prescribed by the image signal values. For that purpose, test cups for predetermined gradations are engraved and interpreted for calibration in a test engraving, also called a test cut, that occurs before the actual engraving of the printing form.

So that the test cups are not visible on the printed product, the test cups in the test cut must be engraved in a cylinder region, referred to below as a test cut region, that does not overlap with the elements of the printing form to be engraved later.

The definition of a corresponding test cut region has hitherto been carried out by an operator directly at the engraving machine. Insofar as an adequate cylinder edge is available, a manual definition of the test cut region is unproblematical. When, however, an adequately large cylinder edge is lacking, then the operator must visually define a corresponding test cut region as exactly as possible between the elements of the printing form to be engraved, which is particularly difficult given printing forms for packaging printing since such a printing form comprises a multitude of relatively small elements.

The operator must work very carefully in order to avoid positioning errors in the manual definition of a test cut region, this leading to extended preparation times for the engraving. Over and above this, the known procedure has the disadvantage that it is not adequately suited for an automatic engraving of printing cylinders.

SUMMARY OF THE INVENTION

It is therefore an object of the present invention to improve a method for engraving printing forms for rotogravure on a print cylinder in an electronic engraving machine such that a faulty positioning of a test cut region suitable for the test cut ensues automatically on the print cylinder.

According to the method of the present invention for the line-by-line engraving of printing forms for rotogravure on a printing cylinder in an electronic engraving machine with an engraving element charged by an engraving control signal that engraves into the cylinder a sequence of cups arranged in an engraving raster, and wherein geometric dimensions of the cups represent gradations to be engraved, positions of elements to be engraved in the printing form are determined by a cylinder layout. Test cups are engraved into the print cylinder within at least one test cut region during a test cut occurring before the engraving of the printing form, geometric dimensions of the test cups are interpreted for calibration of the engraving control signal. Size and position of the test cut region are determined based on the cylinder layout for avoiding a faulty positioning of the test cut region on the print cylinder.

The invention is explained in greater detail below on the basis of FIGS. 1 through 3.

DESCRIPTION OF THE PREFERRED EMBODIMENTS

Figure 1:
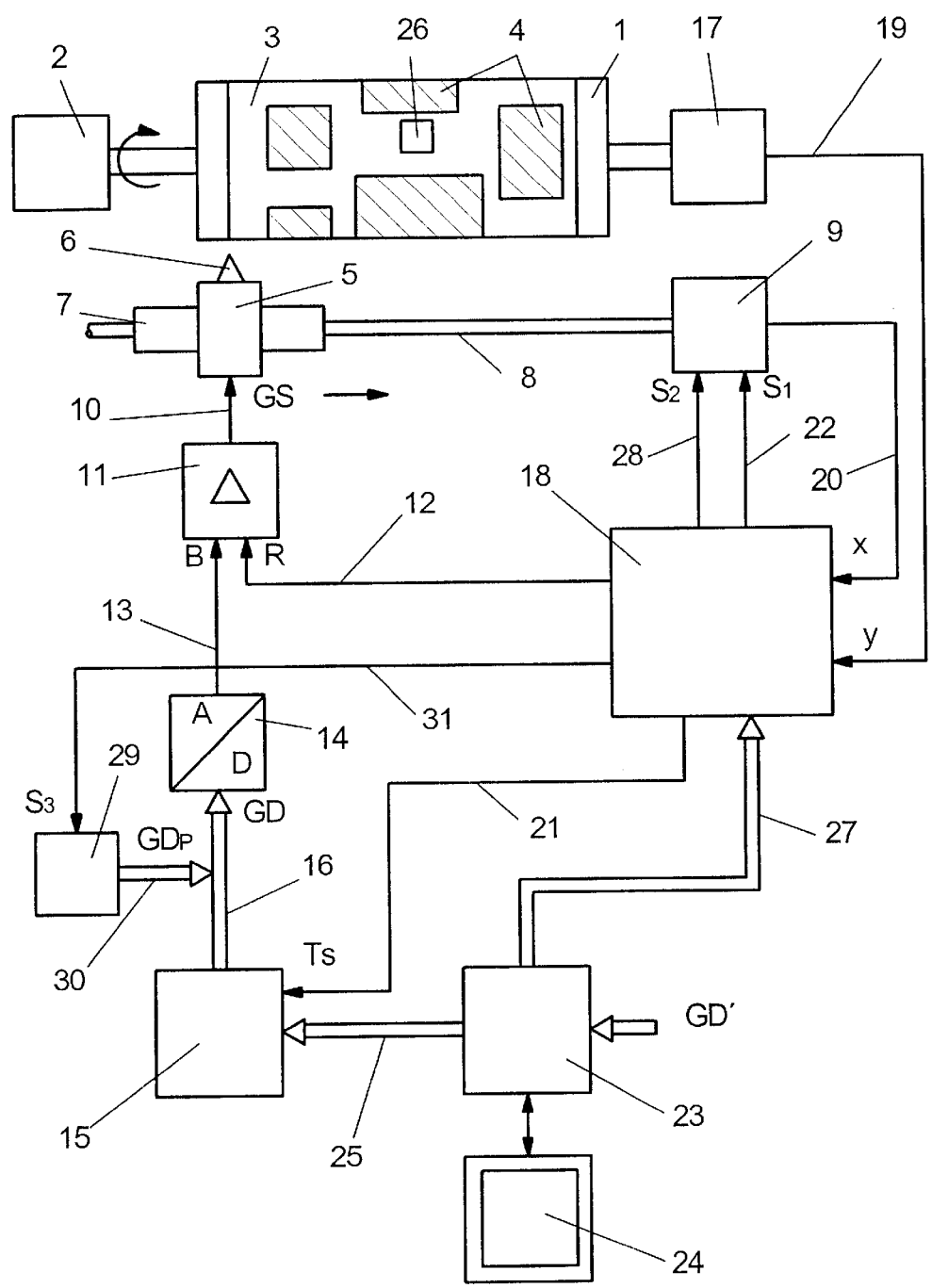
FIG. 1 is a schematic block circuit diagram of an engraving machine for print cylinders.

FIG. 1 shows a schematic block circuit diagram of an engraving machine with a print cylinder 1 that is rotationally driven by a cylinder drive, 2.

For example, the engraving machine is a HelioKlischograph® of Hell Gravure Systems GmbH, Kiel, DE.

A printing form 35 that is composed of individual elements 4, called single copies, positioned and compiled according to a cylinder layout' is to be engraved on the print cylinder 1 with an engraving element 5.

The engraving element, which, for example, is designed as an electromagnetic engraving elements with an engraving stylus 6 a cutting tool is located on an engraving carriage that can be moved in the axial direction of the print cylinder 1 by an engraving carriage drive 9 with a spindle 8

The engraving styli 6 of the engraving element 5 cut a sequence of cups arranged in an engraving raster into the generated surface of the rotating print cylinder 1 engraving line by engraving line while the engraving carriage 7 with the engraving element 5 moves along the print cylinder 1 in the feed direction (axial direction) for planar engraving. Given the illustrated exemplary embodiment, the engraving of the cup occurs on individual engraving lines proceeding circularly in the circumferential direction around the print cylinder 1, whereby the engraving carriage implements an axial feed step to the next engraving line after engraving an engraving line. Such an engraving method is disclosed, for example, by U.S. Pat. No. 4,013,829. Alternatively, the engraving of the printing form can also occur in an engraving line proceeding helically around the print cylinder 1. In this case, the engraving carriage 7 moves continuously along the print cylinder 1 during the engraving.

The engraving stylus 6, of the engraving element 5 is controlled by an engraving control signal (GS) on a line 10. The engraving control signal (GS) is formed in an engraving amplifier 11 from the superimposition of a periodic raster signal (R) on a line 12 with an image signal (B) on a line 13 that represents the gradations between "light" (white) and "dark" (black) of the cups to be engraved. Whereas the periodic raster signal (R) effects a vibrating lifting motion of the engraving styli 6 for producing the engraving raster, the image signal values (B) determine the respective geometrical dimensions such as penetration depth, transverse diagonal and longitudinal diagonal of the cups engraved in the generated surface of the print cylinder 1 in conformity with the gradations to be engraved.

The analog image signal (B) is acquired in an A/D converter 14 from the engraving data (GD) of the printing form 3 to be engraved. For example, an engraving datum of at least one byte that, among other things, contains the gradations between "dark" (GD=161) and "light" (GD=1) to be engraved as engraving information is allocated to each engraving location for a cup. The engraving data (GD) are deposited in an engraving data memory 15 from which they are read out engraving line by engraving line via a data line 16 and supplied to the A/D converter 14.

The engraving locations for the cups prescribed by the engraving raster are defined by location coordinates (x, y) of an XY coordinate system allocated to the print cylinder 1, whose Y-axis is oriented in the circumferential direction of the print cylinder 1 engraving direction and whose X-axis is oriented in the axial direction of the print cylinder 1 (feed direction). A position sensor 17 mechanically coupled to the print cylinder 1 generates the y-location coordinates, and the engraving carriage drive 9 generates the corresponding x-location coordinates of the engraving locations on the print cylinder 1. The location coordinates (x, y) are supplied via lines 19, 20 to a controller 18 that controls the engraving sequence.

Among other things, the controller 18 generates a read clock sequence (Ts) on a line 21 for reading out the engraving data (GD) from the engraving data memory 15, a control command "feed" ($S_1$) on a line 22 for controlling the feed steps of the engraving carriage 7, and the raster signal (R) on the line 12. The frequency of the raster signal (R) together with the circumferential speed of the print cylinder 1 and the axial feed step width of the engraving carriage define the geometry of the engraving raster with respect to screen angle and raster width.

A cylinder layout determines the desired positions of the single copies 4 in the printing form 3 as well as monitoring and control characters. Such a cylinder layout of the printing form 3 is designed by an operator off-line in a workstation 23 by manual positioning of the single copies 4 with a cursor or by input of position coordinates under visual control at a monitor 24. Subsequently, the engraving data (GD) of the printing form 3 are compiled engraving line by engraving line from the engraving data (GD') of the single copies 4 in the workstation 23 on the basis of the formatted cylinder layout.

The engraving data (GD') of the single copies 4 are acquired, for example, by point-by-point and line-by-line optoelectronic scanning of halftone and line masters with a scanner and by assembling the individual masters in an image processing system.

For example, the workstation HelioCom™ of Hell Gravure Systems GmbH, Kiel, DE, can be employed for designing the cylinder layout and for the data-related formatting of the printing form 3 on the basis of the cylinder layout.

The engraving data (GD) of the printing form 3 generated in the workstation are transferred via a data line 25 into the engraving data memory 15, and the engraving of the printing form 3 can begin.

The test cut is implemented before engraving the printing form 3, this beginning with the definition and positioning of a suitable test cut region 26 on the print cylinder 1 between the single copies 4 of the print form 3. Inventively, the definition of at least one test cut region 26 already occurs on the basis of the cylinder layout upon generation of the engraving data (GD) of the printing form 3 in the workstation 23. Various methods are conceivable for this purpose.

The operator defines a specific size of the test cut region 26 as a plurality of engraving data (GD>161) outside the value range between "light" (GD=1) and "dark" (GD=161) in X-direction and Y-direction. At least one test cut region 26 of a corresponding size is then identified in the workstation 23 with an automatic search run in the dataset of the engraving data (GD) of the printing form 3, and the position of the test cut region 26 is marked in the cylinder layout.

Alternatively thereto, the operator, under visual control, can select a suitable test cut region 26 in the cylinder layout displayed on the picture screen of the monitor 24 of the workstation and can mark the selected test cut region 26 on the picture screen with a special color using a suitable cursor or by presentation in a specific layer.

Upon transfer of the engraving data (GD) from the workstation 23 into the engraving data memory 15, the marked test cut region 26 is identified and the appertaining position data (PD) of the test cut region 26 in the cylinder layout or, respectively, in the overall printing form 3 are communicated via a data line 27 to the controller 18 and stored thereat. Alternatively thereto, the position data (PD) can also be stored together with the engraving data (GD) in what is referred to as a job ticket for a later engraving.

The position data (PD) can, for example, be the coordinates ($x_P$, $y_P$) of the engraving start point for the test cut in a corner point of the test cut region 26 as well as the width ($\Delta x_P$) and height ($\Delta y_P$) of the test cut region 26 or the coordinates ($x_P$, $y_P$) of the corner points of the test cut region 26.

A control command "engraving start point" ($S_2$) and a control command "test engraving" ($S_3$) are derived from the position data (PD) in the controller 18.

With the control command "start point" ($S_2$) on a line 28 to the engraving carriage drive 9, the engraving carriage 7 with the engraving element 5 is automatically displaced in the axial direction onto the engraving start point of the test cut region 26 before the test engraving.

Subsequently, the engraving of the test cups for predetermined gradations is started on the print cylinder 1 within the defined test cut region 26. The in engraving data ($GD_P$) for engraving the test cups within the test cut region 26 that correspond to the predetermined gradations are produced engraving line by engraving line in a test cut generator 29 and are forwarded to the D/A converter 14 via a data line. During the test engraving, the control command "test cut" ($S_3$) on a line 31 controls the test cut generator 29 in such a way that the engraving data ($GD_P$) relevant for the test cut in every engraving line are forwarded to the engraving element 5 only for the time span during which the engraving stylus 6 of the engraving element 5 is located within the test cut region 26 on the print cylinder After the test cut, the geometric actual dimensions of the test cups are identified and compared to the geometrical rated dimensions of those cups that represent the gradations prescribed for the test engraving. Setting values with which the engraving control signal (GS) in the engraving amplifier 19 is calibrated such that the cups are produced with correct gradation in the later engraving of the printing form are acquired from the comparison of the geometric dimensions.

Figure 2:
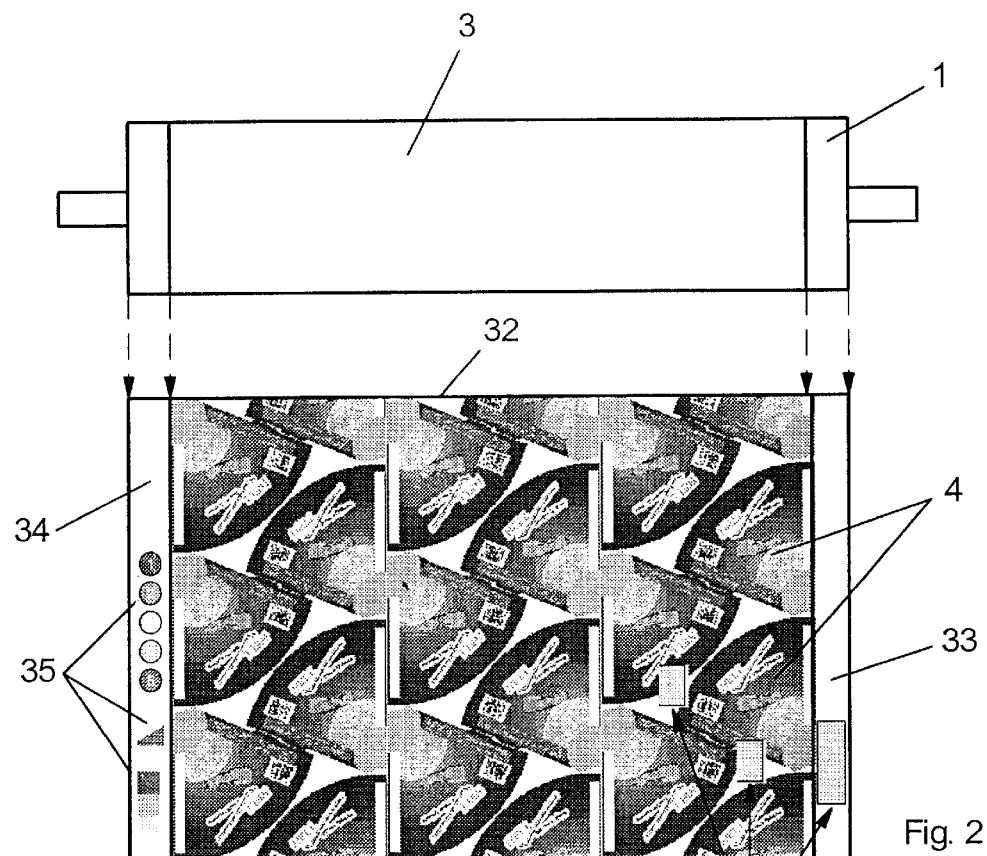
FIG. 2 shows a cylinder layout.

FIG. 2 shows a practical cylinder layout 32 for the printing form 3 to be engraved on the print cylinder 1. Multiply positioned single copies 4 with test cut regions 26 lying between the single copies 4 or at an edge 3 of the cylinder layout 32 are shown in the cylinder layout 32. Monitoring and control characters 35 that are to be co-engraved on the printing form 3 are visible at the other edge 34.

Figure 3:
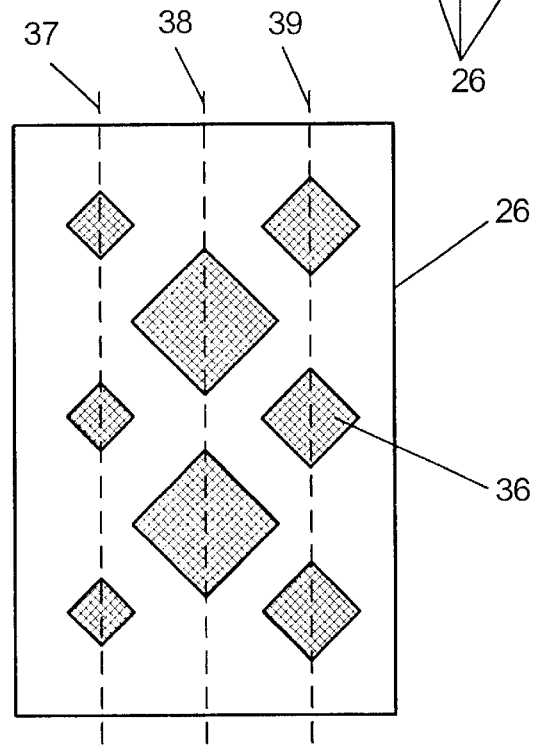
FIG. 3 illustrates a test cut region.

FIG. 3 shows a test cut region 26 in which test cups 36 were engraved on three engraving lines lying side-by-side, namely test cups 36 representing the gradation "light" on the engraving line 37, test cups 36 representing the gradation "dark" on an engraving line 38 and test cups 36 corresponding to a "medium gradation" on the engraving line 39.

Although various minor changes and modifications might be proposed by those skilled in the art, it will be understood that my wish is to include within the claims of the patent warranted hereon all such changes and modifications as reasonably come within my contribution to the art.

I claim:

1. A method for line-by-line engraving of printing forms for rotogravure on a print cylinder in an electronic engraving machine with an engraving element charged by an engraving control signal that engraves into the cylinder a sequence of cups arranged in an engraving raster and wherein geometric dimensions of the cups represent gradations to be engraved, comprising the steps of:

determining positions of individual printing form elements to be engraved in the printing form by a computer generated cylinder layout in a computer work station, wherein the print cylinder comprises two end portions and a main engraving portion, the individual printing form elements being in the main engraving portion;

engraving test cups into the print cylinder within at least one test cut region during a test cut occurring before the engraving of the printing form and interpreting geometric dimensions of the test cups for calibration of the engraving control signal; and determining size and position of the test cut region based on the computer generated cylinder layout for avoiding a faulty positioning of the test cut region on the print cylinder and for positioning the test cut region between individual printing form elements.

2. The method according to claim 1 including the step of utilizing the computer generated cylinder layout in the computer workstation to automatically determine size and position of the test cut region within the cylinder layout.

3. The method according to claim 1 wherein the engraving control signal for the engraving element is acquired from engraving data, whereby an engraving datum that represents a gradation between "light' and "dark" is allocated to each cup;

the engraving data of the printing form to be engraved are generated according to the cylinder layout from the engraving data of the individual printing form elements to be engraved within the printing form;

a size of the test cut region is prescribed;

the test cut region having the prescribed size is determined by a search run in a dataset of the engraving data of the printing form and is marked; and the marked test cut region is converted into corresponding position data.

4. The method according to claim 1 wherein the engraving control signal for the engraving element is acquired from engraving data, whereby an engraving datum that represents a gradation between "light' and "dark" is allocated to each cup;

the engraving data of the printing form to be engraved are generated according to the cylinder layout from the engraving data of the individual elements to be engraved within the printing form;

the test cut region marked in the cylinder layout is identified in the generation of the engraving data; and the identified test cut region is converted into corresponding position data.

5. The method according to claim 4 wherein the position data define a coordinate-related position of the test cut region in the printing form on the print cylinder.

6. The method according to claim 4 wherein the position data of the engraving machine are supplied to a controller for the test engraving.

7. The method according to claim 4 wherein the engraving element is displaceable in an axial direction of the print cylinder for planar engraving; and the engraving element is positioned onto an axial engraving start point of the test cut region based on the position data before the engraving of the test cups.

8. The method according to claim 4 wherein the position data control the engraving of the test cups within the test cut region during the test cut.

9. The method according to claim 4 wherein the position data together with the engraving data of a printing form are stored for later employment.

10. The method according to claim 1 wherein test cups are engraved for predetermined gradations;

geometrical actual dimensions of the engraved test cups are measured and compared to the rated dimensions of the predetermined gradations; and setting values for the calibration of the engraving control signal are required from the comparison.

11. The method according to claim 10 wherein gradations for "light" and "dark" are prescribed for the engraving of the test cups.

12. The method according to claim 11, wherein at least one "medium" gradation is additionally prescribed for the engraving of the test cups.

13. The method according to claim 10 wherein at least one test cup per prescribed gradation is engraved on each engraving line within the test cut region.

14. A method for line-by-line engraving of printing forms for rotogravure on a print cylinder in an electronic engraving machine with an engraving element charged by an engraving control signal that engraves into the cylinder a sequence of cups arranged in an engraving raster and wherein geometric dimensions of the cups represent gradations to be engraved, comprising the steps of:

determining positions of individual printing form elements to be engraved in the printing form by a computer generated cylinder layout in a computer work station, wherein the print cylinder comprises two end portions and a main engraving portion, the individual printing form elements being in the main engraving portion;

engraving test cups into the print cylinder within at least one test cut region during a test cut occurring before the engraving of the printing form and interpreting geometric dimensions of the test cups for calibration of the engraving control signal;

determining size and position of the test cut region based on the computer generated cylinder layout for avoiding a faulty positioning of the test cut region on the print cylinder and for positioning the test cut region between individual printing form elements;

the cylinder layout is designed by positioning the elements in the workstation under visual control at a monitor; and the desired test cut region is subsequently marked in terms of size and position in the cylinder layout during design of the cylinder layout.

15. The method according to claim 14 wherein the desired test cut region is marked by a special color in the cylinder layout.

16. The method according to claim 14 wherein the desired test cut region is marked by a specific layer in the cylinder layout.

17. A method for engraving of a printing form on a print cylinder with an engraving element that engraves into the cylinder a sequence of cups arranged in an engraving raster and wherein geometric dimensions of the cups represent gradations to be engraved, comprising the steps of:

determining positions of printing form elements to be engraved in the printing form by a computer generated cylinder layout in a computer work station, wherein the print cylinder comprises two end portions and a main engraving portion, the printing form elements being in the main engraving portion;

engraving test cups into the printing cylinder within at least one test cut region during a test cut occurring before the engraving of the printing form and interpreting geometric dimensions of the test cups for calibration of the engraving control signal; and determining size and position of the test cut region based on the computer generated layout so as to position the test cut region between printing form elements.

18. The method according to claim 17 including the step of utilizing the computer generated cylinder layout in the computer workstation to automatically determine size and position of the test cut region within the cylinder layout.

* * * * *